March 17, 1964 T. L. HARTMAN 3,124,939
METHOD OF PRODUCING REFRIGERATION EMPLOYING
BICARBONATE SOLUTIONS
Filed Aug. 13, 1962
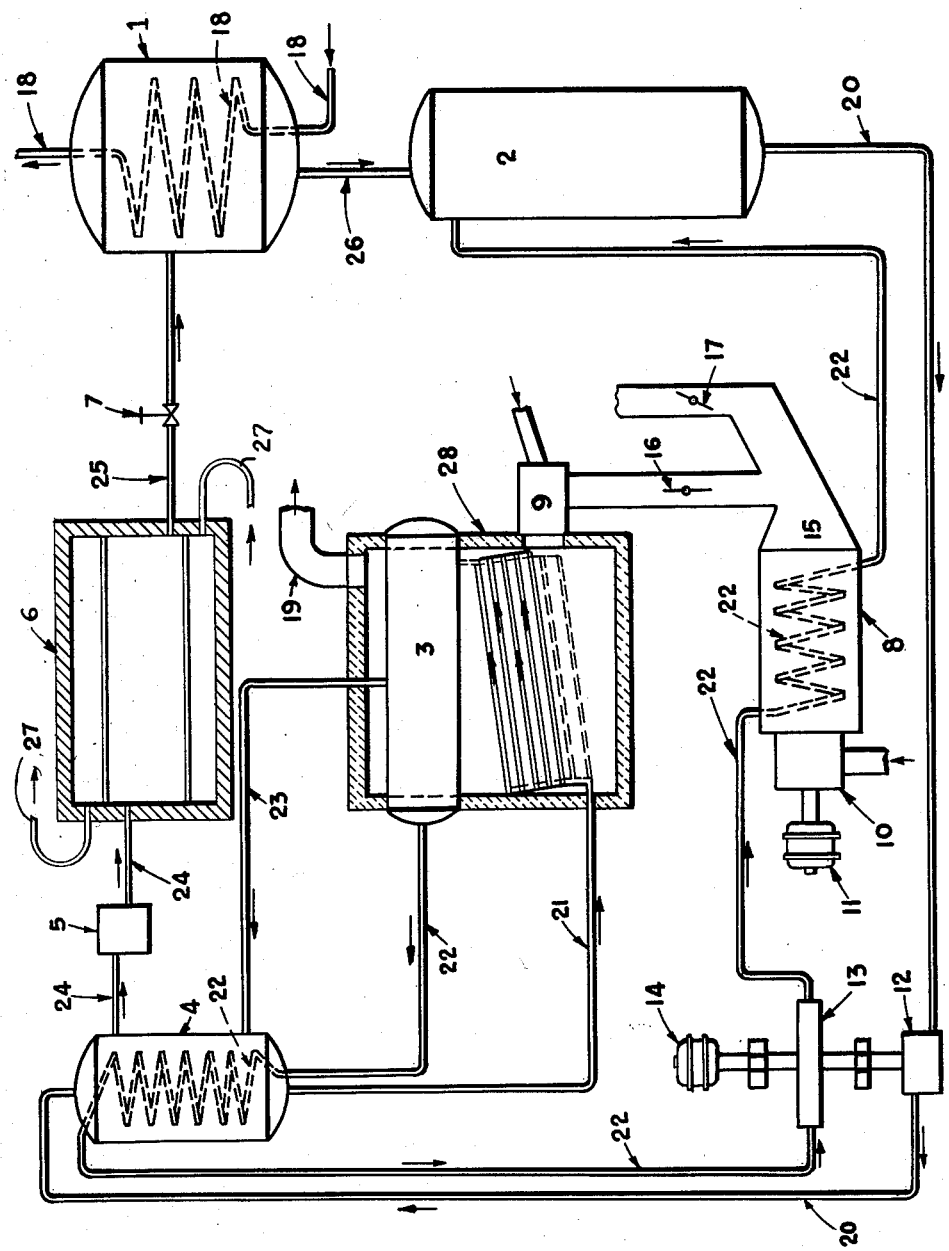
INVENTOR
THOMAS L. HARTMAN
BY

United States Patent Office 3,124,939
Patented Mar. 17, 1964

3,124,939
METHOD OF PRODUCING REFRIGERATION EMPLOYING BICARBONATE SOLUTIONS
Thomas L. Hartman, Winter Park, Fla., assignor to H₂O International, Inc.
Filed Aug. 13, 1962, Ser. No. 216,559
7 Claims. (Cl. 62—112)

This invention relates to a method of producing refrigeration, and to a plant in which the method may be practiced or carried out.

My invention is generally aimed to provide a method which effects a material saving in the quantity of fuel necessary for the production of refrigeration and which is more compact, economical in cost of production, installation and upkeep generally.

A prime object is to provide a method wherein the refrigerant vapor when expanded into a vacuum is as efficiently carried into the high pressure side of the system as it would be if the evaporator operated at a much higher pressure.

Further objects are to provide a method of greatly reducing the size of the evaporator by creating a very great temperature difference between the refrigerant and the work load requiring refrigeration. This factor also reduces the time required to accomplish the freezing or cooling. Another object is to reduce the quantity of fuel required for a given amount of refrigeration and thereby to reduce costs.

In the practice of my invention, I employ a refrigerant and a carrier compound solution, which reacts chemically with the refrigerant vapor to form a new compound solution.

Another important object is to provide a method wherein the foregoing objects and advantages, with others, may be attained through the use of chemicals when used in the form of a gas which is absorbed by a carrier solution, from which it is driven off by heat, then liquified and expanded into low pressure, to refrigerate and become a gas again and repeating the cycle of operation, the materials being preferably carbon-dioxide as the gas and a carbonate solution which, by absorption of said gas, produces a bicarbonate solution.

My invention is to be distinguished from the ammonia absorption refrigeration system in that my invention is a pure chemical reaction, that is, weighted proportions, and the chemical proportions are:

$$2KHCO_3 \rightleftharpoons K_2CO_3 + H_2O + CO_2$$

while the ammonia absorption is mainly a physical absorption, in which the pounds of ammonia absorbed is dependent upon the pressure involved.

Various additional objects and advantages will become apparent and in part be pointed out in the following description taken in connection with the accompanying drawing, in which the single view illustrates my novel refrigerating plant diagrammatically.

Referring specifically to the drawing, 3 designates a boiler or heater, which may be of any desired type. The heater or boiler 3 is adapted to heat a chemical compound in solution which, when comparatively cool, is adapted to absorb or carry a gas therein in chemical combination therewith, but which, upon a suitable increase in temperature, is adapted to liberate or evolve such gas, and steam leaving a residual solution or salt identical with the original solution or salt with which the gas combined to form the compound. This carrier or basic solution is preferably a water solution of sodium carbonate, potassium carbonate or barium carbonate, while the gas is preferably carbondioxide. The exact quantity of gas which will combine with one of said carbonate solutions depends upon the particular carbonate solution, the amount of carbonate present, its temperature, the reactivity of the gas therewith, and the temperature of the latter.

A condenser 6 is used to condense the gas to a liquid, and may be of any desired type. Pipe 25 conveys the liquid to the evaporator 1, which may also be of any desired type. An expansion valve 7 is installed in pipe 25 where same enters the evaporator. This valve controls the flow of high pressure liquid into the low pressure side of the refrigeration system. Pump 12 also separates the low pressure from the high pressure side of said system. 18 represents the heat transfer surface, where a product or refrigeration load is cooled or frozen. In the actual operation of this invention the low pressure side would be preferably operated at some selected low pressure, so that the carbon dioxide would attain a low temperature. Therefore, with a normal refrigerated product, there would be a very great temperature difference, which would create some advantages, namely, less heat transfer surface, less time required to cool or freeze the product and therefore less cost.

In the evaporator 1 the carbon-dioxide absorbs heat through the wall surface of 18, this heat being taken from the product undergoing refrigeration, and causes the refrigerant to become again a vapor or gas which is then conveyed through pipe 26 to the absorber 2, where it comes into direct contact with the comparatively cool carbonate solution. The gas reacts with the said solution and becomes a bicarbonate solution. This reaction is substantially unaffected by any change of pressure within the absorber 2, while in the ammonia absorption system a change in pressure greatly affects the rate of ammonia being absorbed.

Pipe 20 conveys the cool bicarbonate solution from absorber 2, and pump 12 forces the said solution into the top of the analyzer heat exchanger 4, where it falls into direct contact with the hot carbon-dioxide gas and steam which is rising from the bottom of said analyzer. The bicarbonate solution also comes into contact with the outside surface of pipe coil 22 in the analyzer. Inside this pipe coil, hot carbonate solution rises counter current to the bicarbonate solution. This pipe coil 22, and the hot gas and steam within analyzer 4 the bicarbonate solution, causing liberation of some carbon-dioxide gas from the bicarbonate solution. The gas which reaches the top of the analyzer 4 becomes about as cool as the bicarbonate entering the top of said heat exchanger. Likewise, the carbonate solution inside 22 leaves the exchanger almost as cool as the entering bicarbonate solution. The steam within analyzer 4 is condensed by the bicarbonate solution and drops to the bottom of the analyzer.

Pipe 24 conveys the gas from the analyzer 4 to the inlet of condensor 6, in which pipe line a gas dryer 5 is installed for removing any trace of water vapor mixed with the gas. This dryer may be of any desired type.

Pipe 21 conveys a mixture of comparatively hot bicarbonate, carbonate solution and condensed steam from the bottom of analyzer heat exchanger 4 to the inlet of boiler 3 heating surface where final heat is added at 9 to complete the removal of the gas from the remaining bicarbonate solution.

Pipe 23 conveys the gas liberated in boiler 3. This connection starts at the top of the boiler drum and terminates near the bottom of the heat exchanger 4, where it comes into direct contact with the descending bicarbonate solution.

Pipe 22 starts at the boiler drum 3 and carries the heated carbonate solution to the coil inside exchanger 4. Leaving from the top of the exchanger, it goes to the entrance of the fluid turbine 13 which is used to reduce the pressure on the carbonate solution before it enters absorber 2 and is also used to help drive pump 12 to which it is connected through the drive shaft. Between the turbine 13 and absorber 2 the pipe 22 is coiled inside the heater 8 where additional heat is removed, from the carbonate solution. Pipe 22 terminates at the top of absorber 2. The heat removed at 8 may, if desired, be used for some useful purpose and as shown on the drawing a blower 10, driven by motor 11 is shown together with duct 15 and dampers 16, 17. The damper 16 controls heated air used in combustion at 9, and damper 17 controls heated air to a building heating system or to a process or to waste.

In liberating carbon dioxide gas from a bicarbonate solution the heat of formation must be added to the solution and the same amount of heat must be removed when the gas enters the carbonate solution to form the bicarbonate.

The removal of the heat of formation may be accomplished in several ways. The drawing shows it being removed at heater 8, in which the carbonate solution is cooled an amount equal to the heat of formation and when said solution reacts with the gas in the absorber 2 the heat is removed in the reaction and is taken up into the formed bicarbonate so that it acquires the same temperature as the carbonate was before it entered heater 8. Another method, not shown on the drawing, for removing this heat of formation from absorber 2 is the incorporation of a heat exchanger within the absorber.

In the arrangement shown on the drawing a portion of the heat of formation in absorber 2 is imparted to the saturated carbon-dioxide gas entering the absorber by pipe 26 which comes from evaporator 1. This saturated vapor may become highly superheated and still react with the carbonate solution.

Item 19 represents the smoke stack of heater 3; 28 represents walls and top casing of the heater; 27 represents the water supply for removing the latent heat of condensation of the gas in pipe 24 of condensor 6; and 14 represents the electric motor, which supplies the extra force to drive pump 12.

Various changes may be resorted to, provided they fall within the spirit and scope of the invention.

I claim:

1. A method of producing refrigeration in a closed system which includes thermally separating carbon dioxide gas and a residual from a chemical solution, causing the separated carbon dioxide gas to condense to form a liquid, expanding the liquid into a lower pressure to cause refrigeration, the heat absorbed evaporating the liquid into a gas again, reducing the pressure on the residual, effecting a recombination chemically of all the gas with the residual to restore the aforesaid chemical solution to its original character and increasing the pressure on the chemical for reuse in succeeding cycles of operation.

2. The method of claim 1, wherein the mass rate of the gas is substantially uniform for any recombination pressure.

3. A method of producing refrigeration, which includes thermally separating gas and a residual from a bicarbonate solution, condensing the said separated gas to form a liquid, reducing the pressure on the liquid gas causing refrigeration, the heat absorbed evaporating the liquid into gas again, reducing the pressure on the residual, effecting a recombination chemically of all the gas with the residual to form the original bicarbonate solution, and increasing the pressure on the bicarbonate solution for reuse in succeeding cycles of operation.

4. The method of claim 3 wherein the gas is carbon dioxide.

5. A method of producing refrigeration comprising the steps of dissociating the major portion of a suitable bicarbonate by heating the whole bicarbonate until carbon dioxide is completely evolved from said major portion, thereby forming a corresponding normal carbonate, condensing said carbon dioxide to form a liquid, reducing the pressure on the liquid carbon dioxide thereby producing refrigeration, the heat absorbed in refrigeration evaporating the said liquid into gas again, causing all of the said carbon dioxide to recombine into the original bicarbonate, and increasing the pressure on the bicarbonate for reuse in succeeding cycles of operation.

6. A method of producing refrigeration comprising the steps of thermally dissociating the major portion of a suitable bicarbonate until carbon dioxide is completely evolved from said major portion, thereby forming a corresponding normal carbonate, removing water vapor from the carbon dioxide, condensing the carbon dioxide gas to form liquid carbon dioxide, reducing the pressure on the liquid carbon dioxide, thereby producing refrigeration by absorbing heat, which evaporates the liquid into a gas, recombining all of the carbon dioxide with the carbonate to form the original bicarbonate, and increasing the pressure on the bicarbonate for reuse in succeeding cycles of operation.

7. A method of producing refrigeration in a completely closed system which includes thermally decomposing a solution into steam, carbon dioxide gas and a residual, condensing said carbon dioxide gas to form a liquid, expanding the liquid into a lower pressure to cause refrigeration, the heat absorbed evaporating the liquid into a gas again, reducing the pressure on the residual, effecting a recombination of the gas with the residual by pure chemical action, to restore the aforesaid solution to its original character, increasing the pressure on the recombined solution directly contacting said recombined solution with the carbon dioxide gas and steam from the decomposition step to condense the steam, and mixing the condensed steam with the solution for reuse in succeeding cycles of operation.

References Cited in the file of this patent

UNITED STATES PATENTS

| 1,506,530 | Kosley | Aug. 26, 1924 |
| 1,698,847 | Keyes | Jan. 15, 1929 |
| 1,866,825 | Smith | July 12, 1932 |
| 1,922,217 | Randel | Aug. 15, 1933 |
| 1,982,672 | Koenemann | Dec. 4, 1934 |
| 2,886,405 | Benson et al. | May 12, 1959 |
| 3,009,327 | Weil | Nov. 21, 1961 |

OTHER REFERENCES

"Dissociation-Cooling: A Discussion," R. L. McKisson, United States Atomic Energy Commission #IRL-86, March 1954, 20 pp., Technical Information Service, Oak Ridge, Tennessee.